United States Patent
Mathis (10) Patent No.: US 10,684,082 B2
(45) Date of Patent: *Jun. 16, 2020

(54) FLEXIBLE TUBE CLEANING LANCE POSITIONER FRAME APPARATUS

(71) Applicant: STONEAGE, INC., Durango, CO (US)

(72) Inventor: Todd Mathis, Durango, CO (US)

(73) Assignee: STONEAGE, INC., Durango, CO (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/007,792

(22) Filed: Jun. 13, 2018

(65) Prior Publication Data

US 2018/0292151 A1    Oct. 11, 2018

Related U.S. Application Data

(63) Continuation of application No. 14/805,682, filed on Jul. 22, 2015, now Pat. No. 10,024,613.

(Continued)

(51) Int. Cl.
*F28G 15/02* (2006.01)
*F28G 15/04* (2006.01)
(Continued)

(52) U.S. Cl.
CPC ............ *F28G 15/02* (2013.01); *F16C 29/005* (2013.01); *F28G 3/163* (2013.01); *F28G 15/04* (2013.01)

(58) Field of Classification Search
CPC ..... B29C 51/26; B29C 51/261; B29C 51/262; F28G 15/02; F28G 1/163; F28G 1/166;
(Continued)

(56) References Cited

U.S. PATENT DOCUMENTS 3,262,731 A * 7/1966 Renfroe .................... B66C 1/48
                                                    294/101
3,459,354 A   8/1969 Land et al.
(Continued)

FOREIGN PATENT DOCUMENTS

DE          3148225        6/1983
DE         29612512       11/1996
(Continued)

OTHER PUBLICATIONS

International Search Report and Written Opinion, dated Oct. 21, 2015, from related International Application No. PCT/US2015/041471.

(Continued)

*Primary Examiner* — Orlando E Aviles
*Assistant Examiner* — Seahee Yoon
(74) *Attorney, Agent, or Firm* — Greenberg Traurig, LLP (57) ABSTRACT

A frame apparatus for holding a flexible lance positioning mechanism adjacent to and spaced from a heat exchanger tube sheet includes an upper guide rail, a lower guide rail, a positioner rail supported from one of the upper and lower guide rails and guided by the other of the upper and lower guide rails, and a rail clamp assembly fastened to a portion of a tube sheet. This rail clamp assembly has a flat plate member fastened to the tube sheet, a base plate spaced from the flat plate by one or more threaded shafts, and one or more clamp fingers rotatably fastened to the base plate. Each clamp fingers is operable to rotate toward the base plate when the base plate is drawn against the flat plate or beam member by rotating the threaded shaft, thus drawing the rail securely to the flat plate of the clamp assembly.

15 Claims, 9 Drawing Sheets

Related U.S. Application Data (60) Provisional application No. 62/028,534, filed on Jul. 24, 2014.

(51) Int. Cl.
*F28G 3/16* (2006.01)
*F16C 29/00* (2006.01)

(58) Field of Classification Search
CPC F28G 1/16; H01L 21/67057; H01L 21/67086
See application file for complete search history.

(56) References Cited

U.S. PATENT DOCUMENTS

| | | | |
|---|---|---|---|
| 3,827,683 A * | 8/1974 | Seborg | B29C 51/262 269/9 |
| 3,938,535 A | 2/1976 | Cradeur et al. | |
| 4,043,375 A | 8/1977 | Casey | |
| 4,095,305 A | 6/1978 | Goodwin | |
| 4,102,527 A | 7/1978 | Alexander | |
| 4,235,362 A | 11/1980 | Hubenko | |
| 4,239,196 A * | 12/1980 | Hanger | B25H 1/0007 269/17 |
| 4,266,709 A | 5/1981 | Krüger | |
| 4,381,105 A | 4/1983 | Goff et al. | |
| 4,404,838 A | 9/1983 | Hare | |
| 4,445,668 A | 5/1984 | Sauber | |
| 4,538,796 A | 9/1985 | Steck | |
| 4,743,175 A | 5/1988 | Gilmore | |
| 4,844,021 A | 7/1989 | Stoss | |
| 4,901,964 A * | 2/1990 | McConnell | A61G 13/101 24/514 |
| 4,944,465 A | 7/1990 | Levine | |
| 5,002,120 A | 3/1991 | Boisture et al. | |
| 5,022,463 A | 6/1991 | Boisture | |
| 5,320,072 A | 6/1994 | Theiss et al. | |
| 5,423,917 A | 6/1995 | Garcia | |
| 5,782,255 A | 7/1998 | Magnin et al. | |
| 5,915,742 A | 6/1999 | Hung | |
| 6,192,904 B1 | 2/2001 | Secknus et al. | |
| 6,557,742 B1 | 5/2003 | Bobeczko et al. | |
| 6,626,195 B1 | 9/2003 | Garman et al. | |
| 6,681,839 B1 * | 1/2004 | Balzer | F28G 1/163 122/379 |
| 7,303,386 B1 | 12/2007 | Kundinger et al. | |
| 7,367,288 B2 | 5/2008 | Kim | |
| 7,448,606 B1 | 11/2008 | Johnson | |
| 7,530,363 B2 | 5/2009 | Garman | |
| 7,798,479 B1 * | 9/2010 | Meeks | H02G 15/24 254/134 |
| 7,877,889 B2 | 2/2011 | Griffin, Jr. | |
| 8,048,234 B2 | 11/2011 | Jacquinet | |
| 8,192,559 B2 * | 6/2012 | Garman | B08B 9/045 134/166 C |
| 8,251,326 B2 * | 8/2012 | McPheeters | E04D 13/1476 248/228.2 |
| 9,057,195 B2 * | 6/2015 | McPheeters | E04D 13/1476 |
| 9,400,145 B2 * | 7/2016 | Mathis | F28G 3/163 |
| 9,605,915 B2 | 3/2017 | Crock et al. | |
| 10,024,613 B2 * | 7/2018 | Mathis | F28G 3/163 |
| 2003/0074944 A1 | 4/2003 | Stjepan et al. | |
| 2003/0079572 A1 * | 5/2003 | Ho | B25B 13/462 81/63.2 |
| 2007/0022950 A1 | 2/2007 | Livingston | |
| 2008/0195109 A1 * | 8/2008 | Hunter | A61B 17/155 606/87 |
| 2009/0067959 A1 | 3/2009 | Takahashi et al. | |
| 2009/0211612 A1 | 8/2009 | Athanassiu et al. | |
| 2010/0284737 A1 * | 11/2010 | McPheeters | E04D 13/1476 403/374.3 |
| 2011/0155174 A1 | 6/2011 | Moll et al. | |
| 2012/0055520 A1 | 3/2012 | Gardner et al. | |
| 2012/0067370 A1 * | 3/2012 | Crock | B08B 9/043 134/6 |
| 2014/0245954 A1 | 9/2014 | Minami et al. | |
| 2015/0068563 A1 * | 3/2015 | Gzym | F28G 15/04 134/168 C |

FOREIGN PATENT DOCUMENTS

| | | |
|---|---|---|
| DE | 19819406 | 11/1999 |
| GB | 1027717 | 4/1966 |
| GB | 2037392 | 7/1980 |
| GB | 2179637 | 3/1987 |
| GB | 230076 | 6/1998 |
| WO | WO96/17695 | 6/1996 |
| WO | WO02/059538 | 8/2002 |
| WO | WO02/068134 | 9/2002 |
| WO | WO2005/003611 | 1/2005 |
| WO | WO2005/054770 | 6/2005 |
| WO | WO2006/021164 | 3/2006 |
| WO | WO2009/088484 | 7/2009 |

OTHER PUBLICATIONS

International Search Report and Written Opinion, dated Oct. 8, 2015, from related International Application No. PCT/US2015/038982.

* cited by examiner

FIG.10

FLEXIBLE TUBE CLEANING LANCE POSITIONER FRAME APPARATUS

CROSS REFERENCE TO RELATED APPLICATIONS

This application is a continuation application of U.S. patent application Ser. No. 14/805,682, filed Jul. 22, 2015, entitled Flexible Tube Cleaning Lance Positioner Frame Apparatus, which claims the benefit of U.S. Provisional Patent Application Ser. No. 62/028,534, filed Jul. 24, 2014, having the same title, each of which is hereby incorporated by reference in its entirety. This application is also related to U.S. patent application Ser. No. 14/693,259, filed Apr. 22, 2015, entitled Flexible Cleaning Lance Drive Apparatus.

BACKGROUND OF THE DISCLOSURE

The present disclosure is directed to high pressure fluid rotary nozzle systems. In particular, embodiments of the present disclosure are directed to an apparatus for positioning one or more flexible tube cleaning lances in registry with a heat exchanger tube sheet.

Conventional lance positioner frames are heavy rigid frame structures that can be assembled adjacent a heat exchanger once the tube sheet flange cover has been removed. Alternatively such frame assemblies can be bolted to the tube sheet directly. U.S. Pat. Nos. 4,095,305, 6,626,195, 6,681,839, and 7,530,363 disclose exemplary rectilinear frames adapted to be positioned adjacent or fastened to a heat exchanger tube sheet. Such assemblies are heavy, generally awkward to set up and utilize, and most require a substantial amount of space adjacent to or in line with the tube sheet which may limit the feasibility of using such assemblies. What is needed is an apparatus for precisely positioning one or more cleaning lances in registry with a heat exchanger tube sheet that is simple to erect, remains rigid, and takes up minimal space adjacent the tube sheet.

SUMMARY OF THE DISCLOSURE

The present disclosure directly addresses such needs. One embodiment of a frame apparatus for holding a flexible lance positioning mechanism adjacent to and spaced from a heat exchanger tube sheet in accordance with the present disclosure includes an upper guide rail, a lower guide rail, a positioner rail supported from one of the upper and lower guide rails and guided by the other of the upper and lower guide rails, and a rail clamp assembly fastened to a portion of a tube sheet. This rail clamp assembly operably holds one of the upper and lower guide rails in a fixed position with respect to the tube sheet. This rail clamp assembly has a flat plate or beam member adapted to be fastened to the tube sheet, a base plate spaced from the flat plate by one or more threaded shafts, and one or more clamp fingers rotatably fastened to the base plate. The one or more clamp fingers is operable to rotate toward the base plate when the base plate is drawn against the flat plate or beam member by rotating the threaded shaft.

In one embodiment the member is an elongated beam having the rail clamp assembly at a distal end of the beam and a screw clamp assembly at a proximal end of the beam. In another embodiment the member is a generally trapezoidal shaped plate having a curved bottom edge and a plurality of apertures therethrough adjacent the bottom edge for receiving a plurality of bolts to fasten the member to the tube sheet. The base plate of the clamp assembly has a pair of spaced apart fingers rotatably supported therein and a pair of spaced apart threaded shafts beneath each of the fingers fastened to the base plate.

Each one of the fingers engages a ball nose spring plunger in a first position permitting a rail to be attached to the assembly and in a second position permitting the rail to be translated along the base plate or rotatably adjusted relative to the base plate. The threaded shaft is operated to draw the base plate to the beam to rotate the one or more fingers to a third position clamping the rail and preventing translation and rotation of the rail with respect to the base plate and tube sheet face.

Further features, advantages and characteristics of the embodiments of this disclosure will be apparent from reading the following detailed description when taken in conjunction with the drawing figures.

DETAILED DESCRIPTION

Figure 1:
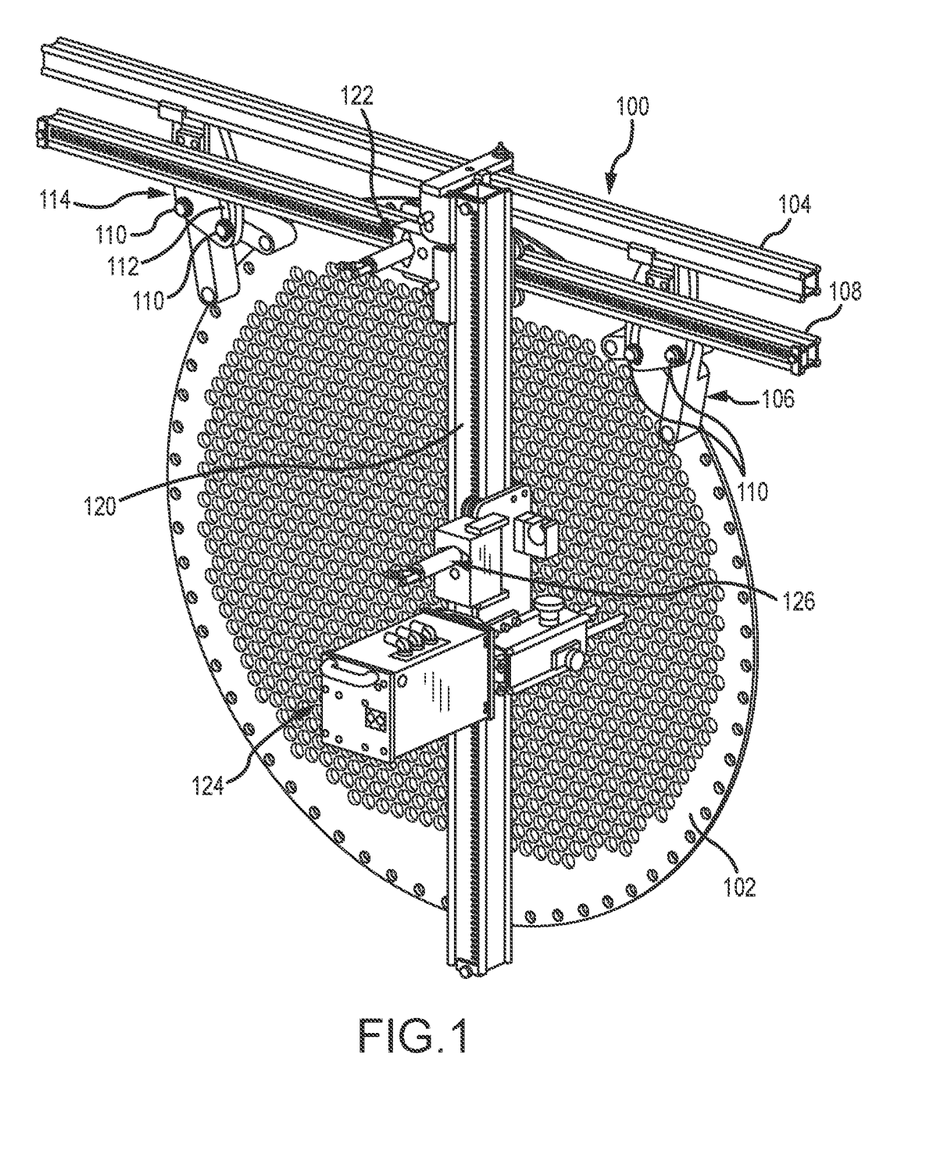
FIG. 1 is a perspective view of a first exemplary embodiment of a flexible lance positioner frame apparatus in accordance with the present disclosure oriented against and fastened to an exemplary heat exchanger tube sheet.

A first exemplary frame apparatus 100 is shown in FIG. 1 bolted to a tube sheet 102. The tube bundle is not shown in this figure for clarity, but it is understood that the tube sheet 102 essentially is the end face of a heat exchanger tube bundle, either removed from a heat exchanger or in place. The apparatus 100 has a top generally horizontal guide rail 104 that is fastened to a common leg of a rigid Y-shaped metal support member 106. The other two legs of the support member 106 are bolted to the tube sheet flange that normally secures the heat exchanger tube side end cover (not shown). A bottom guide rail 108 is adjustably mounted and aligned parallel to the top guide rail 104 via a bolt 110 through an arcuate slot 112 in a flat bracket 114 that is fastened to the center of the Y-shaped support member 106 via another bolt 110.

A positioner support rail 120 is oriented orthogonal to the lower guide rail 108, i.e. substantially vertically as shown in FIG. 1, and is driven by a remotely controlled air motor 122 horizontally along the lower guide rail 108. A flexible lance positioner drive assembly 124 is mounted on the positioner support rail 120. The position of the drive assembly 124 is changed along the support rail 120 via a remotely controlled air motor and gear assembly 126 in order to align the drive assembly 124 in registry with particular tubes in the tube bundle to be cleaned. The flexible lance drive 124 can then insert or withdraw one or more flexible lances (not shown) into and out of the tubes to which it is aligned.

Figure 2:
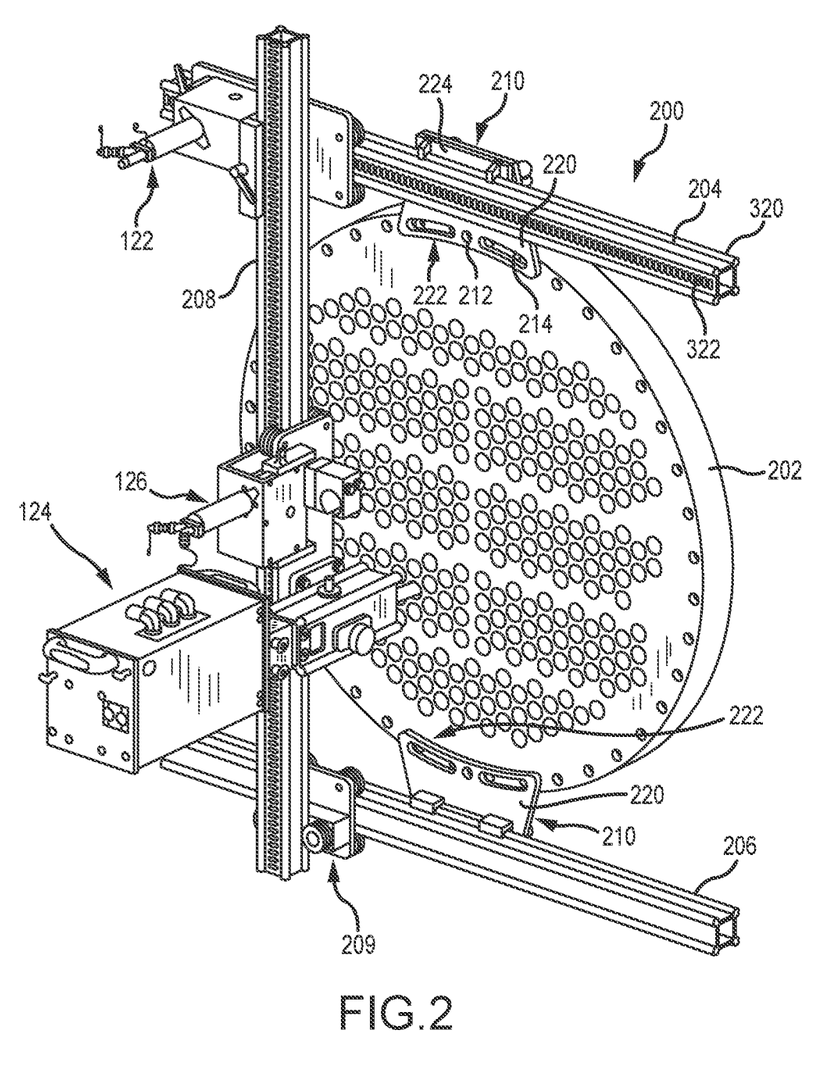
FIG. 2 is a perspective view of a second exemplary embodiment of a flexible lance positioner device in accordance with the present disclosure oriented against and fastened to a heat exchanger tube sheet.

A second exemplary frame apparatus 200 in accordance with the present disclosure is shown in FIG. 2. The apparatus 200 has an upper generally horizontal guide rail 204, a lower guide rail 206, and a positioner support rail 208 that supports a flexible lance positioner drive assembly 124 as in the first embodiment shown in FIG. 1. The upper guide rail 204 serves to provide mechanical alignment with rows of tubes present in the heat exchanger bundle. When so aligned, the drive assembly 124 can be moved up and down along the support rail 208 to precise positions in line adjacent with selected tubes within the tube sheet 202. The lower guide rail 206 does not have to be installed parallel to the upper guide rail 204 as the lower guide rail follower carriage 209 can tolerate reasonable rotation within a plane roughly parallel to the face of the tube sheet 202. The lower guide rail 206 and lower guide rail follower carriage 209 serve to mechanically support the drive assembly 124 in position and prevent deflection away from the tube sheet 202 generated by jet thrust, machine mass or force imparted to the system by the interaction between the drive assembly 124, the flexible lance(s) and the heat exchanger tubes.

Figure 9:
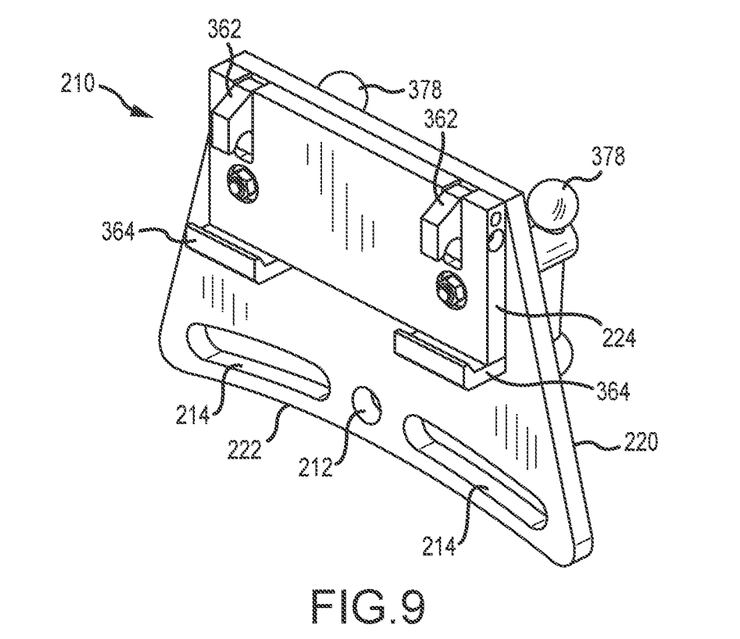
FIG. 9 is a separate perspective view of a dual jaw clamp assembly utilized in the second exemplary embodiment of the positioner frame apparatus shown in FIG. 2.

Each of the upper and lower guide rails 204 and 206 is fastened to the tube sheet 202 via a dual jaw clamp assembly 210 shown in more detail in FIG. 9. Each clamp assembly 210 is designed to be fastened to the tube sheet 202 via a bolt through the center hole 212 or through one of the slots 214 and preferably another bolt through the other one of the slots 214. The clamp assembly 210 has a generally trapezoidal flat mounting base plate 220 that has a curved base edge 222. Parallel to the base edge 222 are the curved slots 214 which sandwich therebetween the center hole 212 above described. By mounting the base plate 220 to a tube sheet 202 via bolts, (not shown), with at least one bolt in one of the slots 214, the orientation of the base plate 220 may be tilted to facilitate alignment of the clamp assembly 210 with respect to a row of tubes penetrating the tube sheet 202. Alternatively the base plate 220 may be fastened to the tube sheet 202 via a single bolt through the center hole 212. In this latter case, the base plate cannot be slid along the slot, but can be rotated about the bolt axis to facilitate alignment. Preferably, however, at least one bolt in one of the slots 214 should be utilized along with another bolt in either the hole 212 or the other slot 214.

The drive mechanism/air motor 122 is remotely operated to move the support rail 208 back and forth along the upper guide rail 204. A follower roller assembly 209 fastens the lower end of the support rail 208 to the lower guide rail 206. This follower roller assembly 209 restricts movement of the support rail 208 away from the tube sheet 202 while permitting free movement of the guide rail 208 back and forth along the lower guide rail 206. In addition, this follower roller assembly 209 permits movement of the support rail 208 toward and away from the upper guide rail 204 while maintaining the support rail 208 in a plane parallel to the tube sheet 202. It is to be understood that the above configuration may be reversed, with the drive mechanism 122 mounted on the lower guide rail 206 and the follower roller assembly 209 mounted on the upper guide rail 204.

Figure 3:
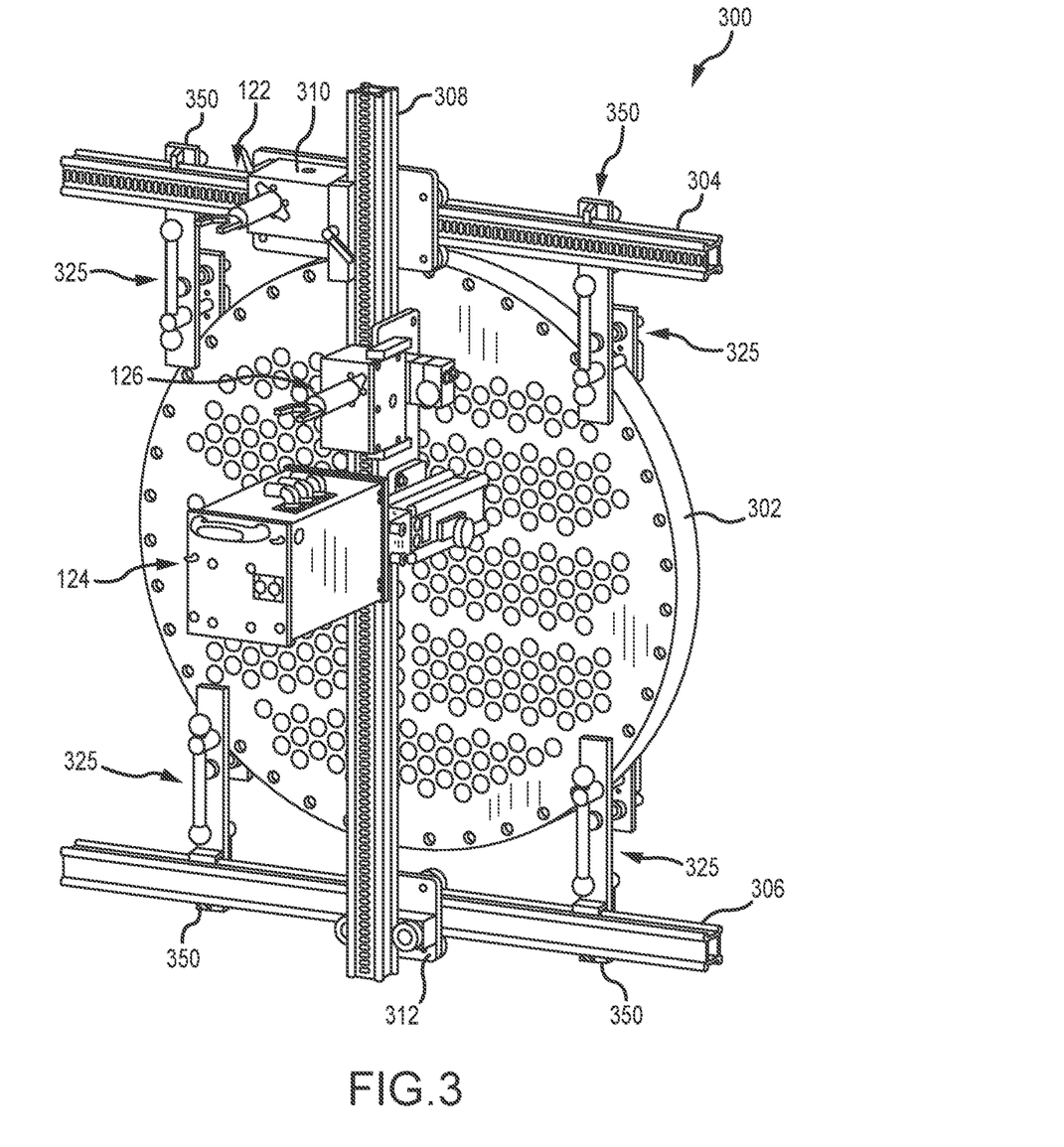
FIG. 3 is a perspective view of a third exemplary embodiment of a flexible lance positioner device in accordance with the present disclosure fastened to a heat exchanger tube sheet shown in FIGS. 1 and 2.

The dual clamp assembly 210 operation is included with the description of the following frame apparatus 300. FIG. 3 is a perspective view of a third exemplary flexible lance positioner frame apparatus 300 in accordance with the present disclosure. This apparatus 300 is particularly designed to permit complete installation of the apparatus 300 on a tube sheet 302 of a heat exchanger without the need for any hand tools and also permits installation to a tube sheet that does not have bolt holes on its peripheral flange.

Apparatus 300 includes an upper guide rail 304, a lower guide rail 306, and a positioner support rail 308. The positioner support rail 308 is moveably fastened to both the upper guide rail 304 and to the lower guide rail 306. A drive mechanism 310 preferably including an air motor 122 is fastened to the upper end of the positioner support rail 308. This drive mechanism 310 is remotely operated to move the support rail 308 back and forth along the upper guide rail 304. A follower roller assembly 312 fastens the lower end of the support rail 308 to the lower guide rail 306. This follower roller assembly 312 restricts movement of the support rail 308 away from the tube sheet 302 while permitting free movement of the guide rail 308 back and forth along the lower guide rail 306. In addition, this follower roller assembly 312 permits movement of the support rail 308 toward and away from the upper guide rail 304 while maintaining the support rail 308 in a plane parallel to the tube sheet 302. It is to be understood that the above configuration may be reversed, with the drive mechanism 310 mounted on the lower guide rail 306 and the follower roller assembly 312 mounted on the upper guide rail 304.

Each of the upper guide rails 104, 108, 204, and 304, the lower guide rails 206, and 306, and the positioner support rail 120, 208 and 308 shown in FIGS. 1-3 is preferably an aluminum extrusion 316 having, in cross section, a generally rectangular tube shape having four side walls 318. An end view or cross section of one embodiment of this extrusion 316 is visible in FIGS. 6 through 8. Each of the four corners of the rail extrusion 316 extends outward to form an axially extending external rib 320. Preferably at least one of the side walls 318 of each guide rail has a series of spaced closed slots 322 forming essentially a ladder surface that designed to operably engage with a drive sprocket (not shown) driven by one of the air motors 122 or 126 shown in FIGS. 1, 2 and 3.

Figure 6:
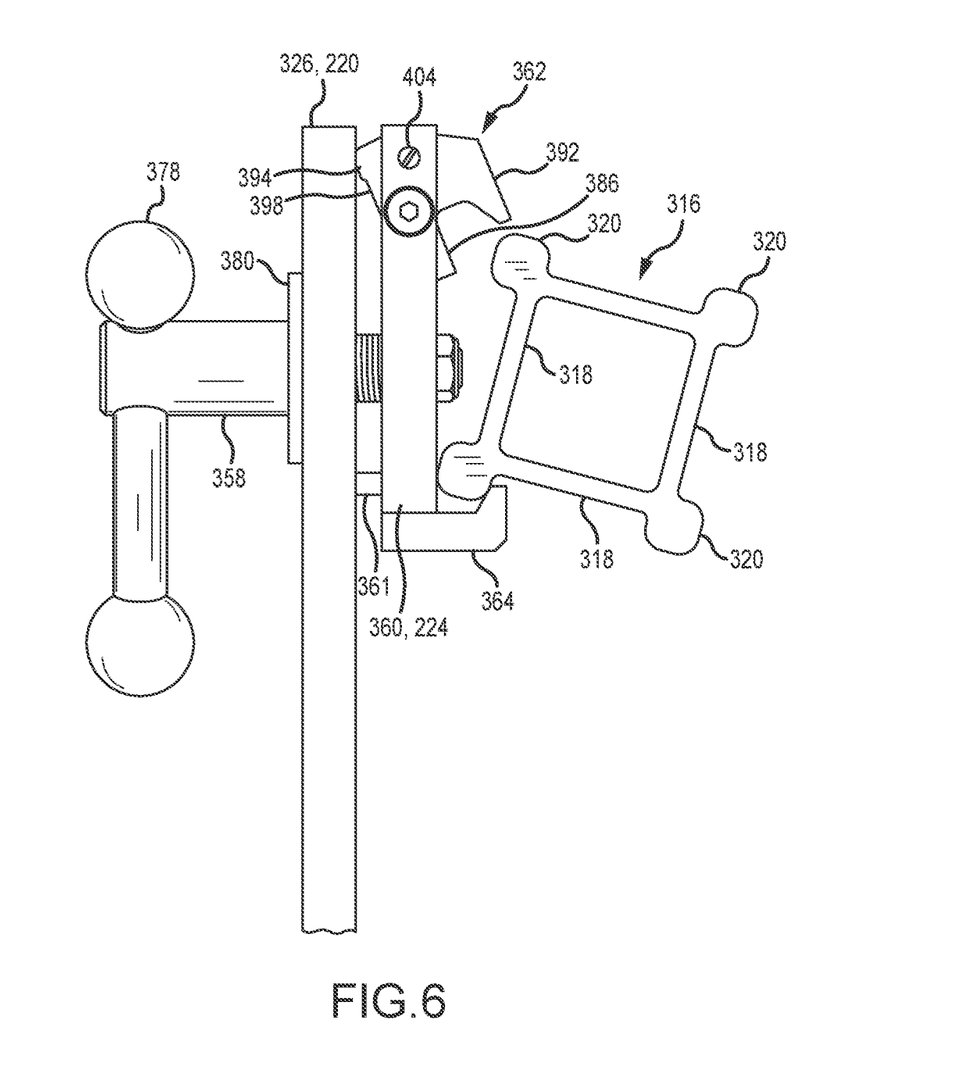
FIG. 6 is a side view of one of the rail clamp assemblies in accordance with the present disclosure with the rail clamp assembly in a first detent position and open to receive a frame rail therein.
Figure 7:
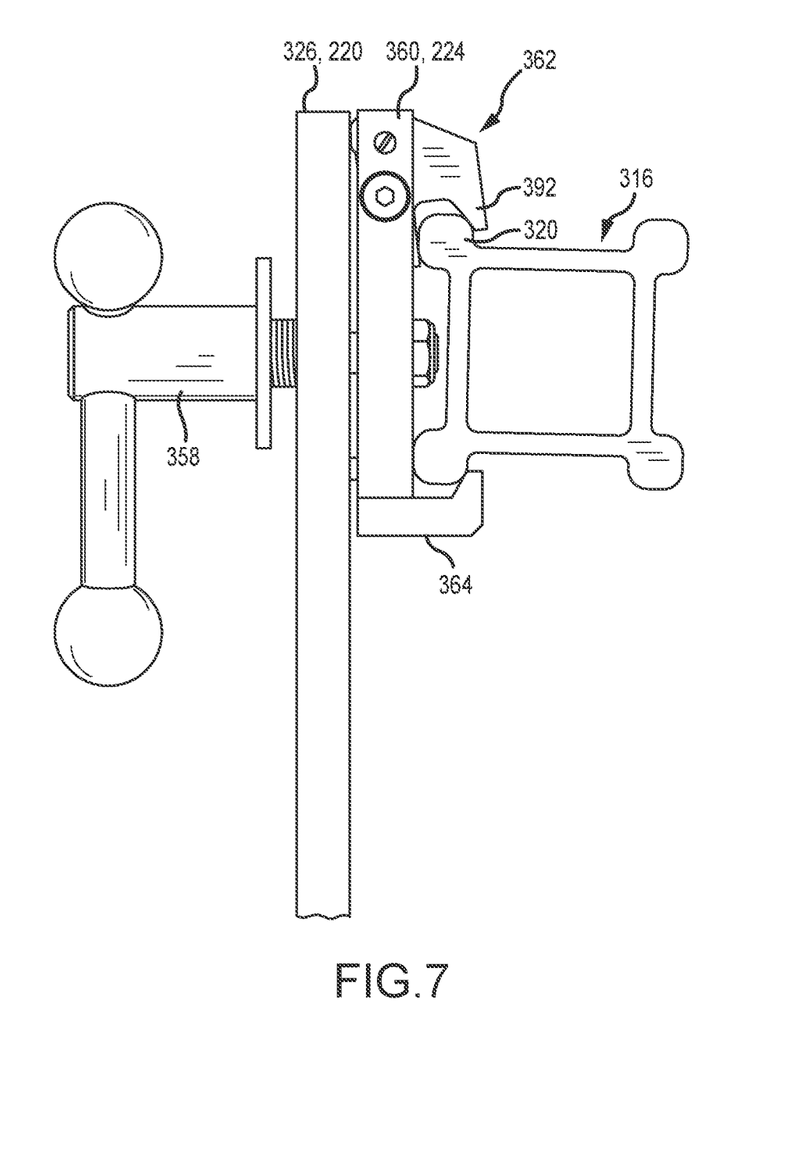
FIG. 7 is a side view as in FIG. 6 with the rail clamp assembly in a second detent position such that the frame rail is retained but remains rotatably and axially adjustable relative to the base plate.
Figure 8:
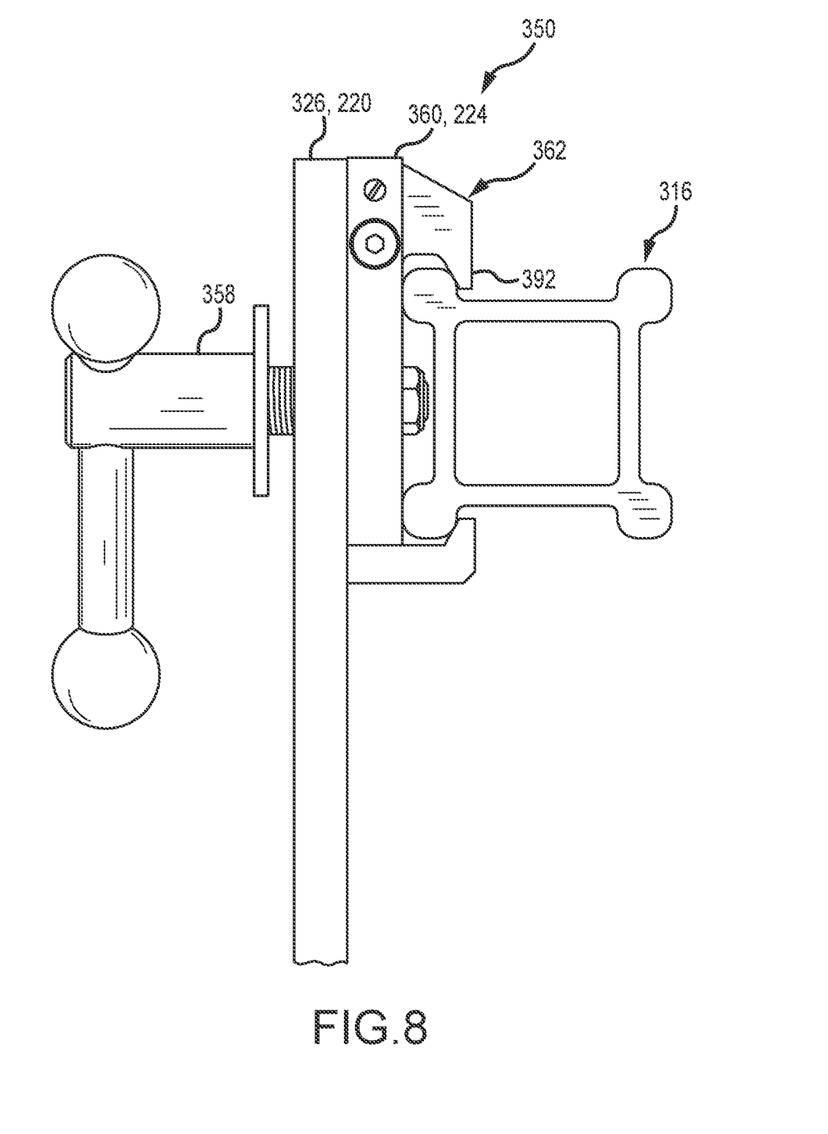
FIG. 8 is a side view as in FIG. 6 with the frame rail clamped in a final fixed position within the rail clamp assembly such that the frame rail is rotatably and axially fixed relative to the base plate.

The external ribs 320 on each of the rails 316 permit each rail 316 to be adjustably and securely held in a secure grip by the clamp mechanisms, either dual rail clamp assembly 210 or single rail clamp assembly 350, the operation of which is shown in FIGS. 6, 7 and 8.

As is best shown in FIG. 3, each of the rails 304 and 306 is fastened securely to the tube sheet 302 by a pair of rail clamp arm assemblies 325 in accordance with the present disclosure. One of the rail clamp arm assemblies 325 is separately shown in a perspective view in FIG. 4. The rail clamp arm assembly 325 has a rail clamp 350 at a distal end of an elongated beam 326 and a screw clamp 328 at the proximal end of the beam 326. The beam 326 is preferably an elongated rectangular metal plate, and may be made of steel or high strength aluminum.

Figure 4:
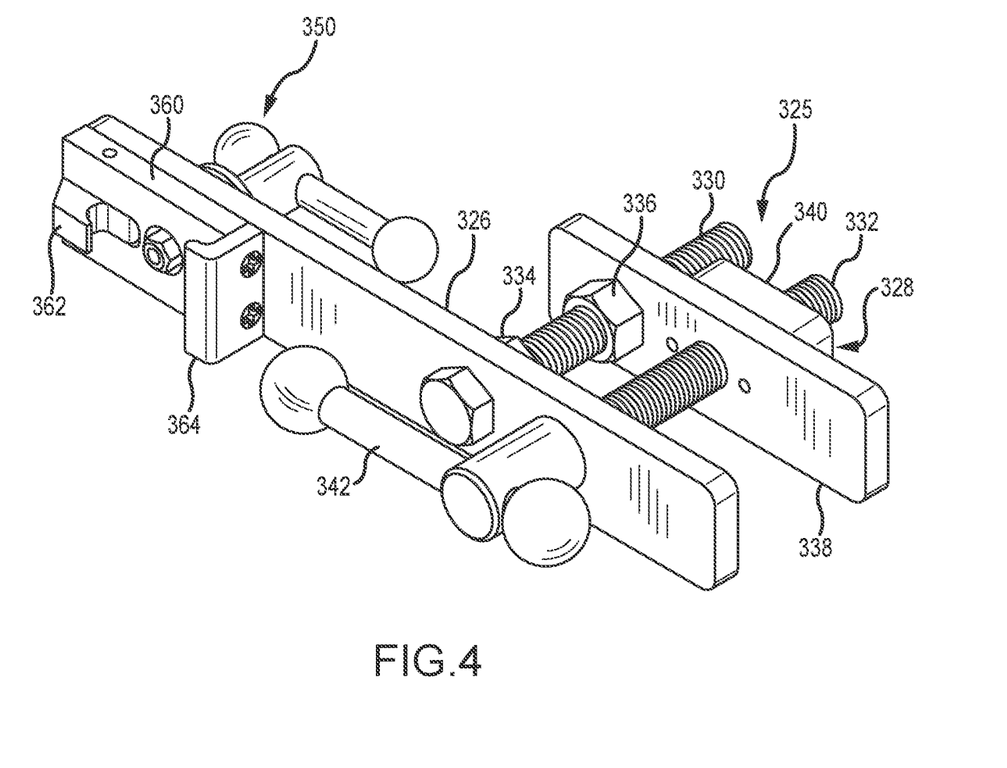
FIG. 4 is a separate perspective view of one of the four clamp arm assemblies shown in FIG. 3.

The screw clamp 328 includes a pair of cross bolts 330 and 332 that pass through smooth axially spaced bores spaced from the proximal end of the beam 326. The cross bolt 330 is fastened to the beam 326 via a nut 334 tightened against and between the head of the bolt 330 and the beam 326. Another nut 336 on the cross bolt 330 sets a minimum jaw width position on the cross bolt 330.

The screw clamp 328 also includes a jaw member 338 that has two bores therethrough spaced to match the spacing between cross bolts 330 and 332 adjacent one end of the jaw member 338. The jaw member 338 is also an elongated metal rectangular plate of steel or high strength aluminum. A caged nut 340 is fixed to an outer side of the jaw member 338 over one of the bores so that it is threaded onto and captures one end of the cross bolt 332. The other end of the cross bolt 332 passing through the beam 326 is fixed to a cross bar handle 342. The screw clamp 328 operates like a bench vice to capture and hold a portion of the heat exchanger flange 302 between the jaw member 338 and proximal end of the beam 326.

The screw clamp 328 is positioned with the beam 326 and jaw member 338 over the edge or rim of the tube sheet flange and bar handle 342 is manually tightened to draw the beam 326 and jaw member 338 together against the tube sheet 302. Different thicknesses of tube sheet 302 flanges may be accommodated by changing the position of nut 336 on the bolt 330 or for considerable increases in flange with, using a longer bolt 330 and cross bolt 332. The rail clamp arm assembly 325 may be positioned anywhere on the rim/flange of the tube sheet 302 so long as the screw clamp 328 can gain a secure purchase on the tube sheet 302. The jaw member 338 and/or the proximal end of the beam 326 may optionally be fit with locating pins (not shown) to fit within one of the bolt holes around the rim/flange of the tube sheet 302 if desired.

At the opposite end of the beam 326 in the rail clamp arm assembly 325 is a single rail clamp assembly 350. This rail clamp assembly 350 is separately shown in an exploded perspective view in FIG. 5. The distal end 352 of the beam 326 has a threaded cross bore 354 therethrough. The distal end 352 also has a pair of arcuate slots 356 around and symmetrically spaced from the threaded cross bore 354 along the beam 326.

Figure 5:
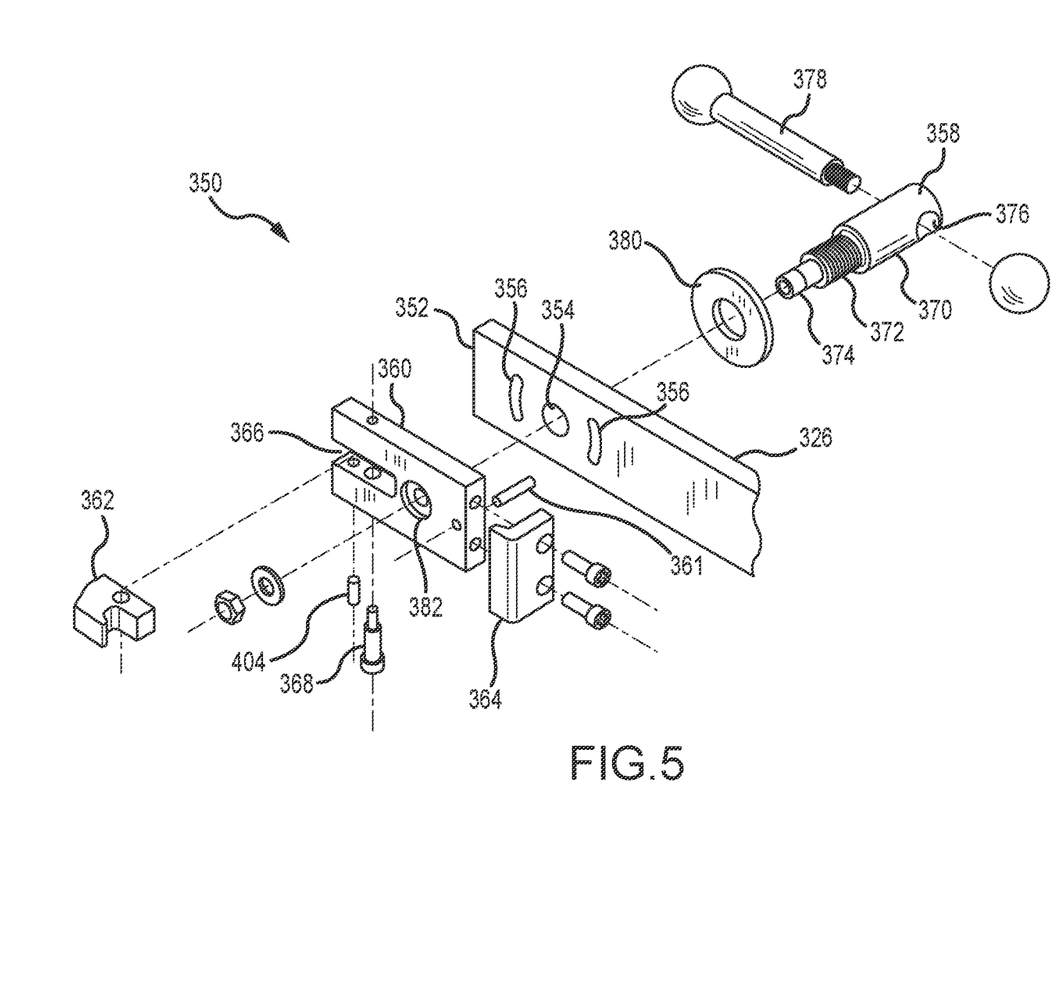
FIG. 5 is an exploded view of the rail clamp assembly of the clamp arm assembly shown in FIG. 4

The rail clamp assembly 350 essentially includes the distal end 352 of the beam 326, a threaded handle shaft 358, a base plate 360, a hooked clamp finger 362 and a static clamp jaw 364 across a bottom end of the base plate 360. The base plate 360 is a generally rectangular flat metal plate having a bottom end to which is fastened the static clamp jaw 364. Alternatively the static metal clamp jaw 364 may be integrally formed with the base plate 360. A top end of the base plate 360 has a cutout recess or rectangular notch 366 sized to receive therein the hooked clamp finger 362. This finger 362 is mounted to rotate about an axle screw 368 that extends across the recess 366 in the top end of the base plate 360.

The threaded handle shaft 358 preferably has a cylindrical portion 370, a threaded portion 372, and a smaller diameter distal threaded end 374. The cylindrical portion 370 has a cross bore 376 through which a handle bar 378 extends. The handle shaft 358 also preferably has a flat washer 380 around a shoulder of the threaded portion 372. The threaded portion 372 engages the threaded bore 354. The smaller diameter threaded distal end 374 passes through a bore 382 through the base plate 360 such that the base plate 360 is fastened securely to the distal end 374 of the handle shaft 358 when the shaft 358 is assembled through the threaded bore 354 through the beam 326.

A guide pin or screw 361 is preferably fastened to and extends outward from a rear surface of the base plate 360 so as to ride within the slot 356 to permit the base plate 360 to be able to rotate through a limited arc about the bore 354 through the beam 326. This guide pin 361 permits the rail clamp assembly 350 to have a limited range of adjustment about the distal end of the beam 326.

Figure 10:
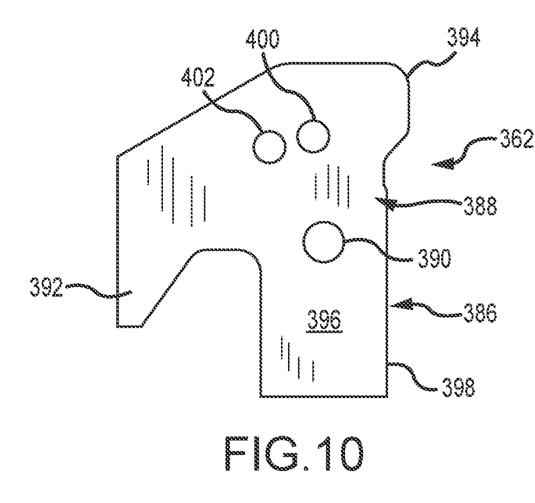
FIG. 10 is a separate side view of a hook clamp finger utilized in the clamp assemblies shown in FIGS. 2 through 9.

A separate side view of the hook clamp finger 362 is shown in FIG. 10. This finger 362 is metal plate that resembles a claw hammer with a parallel sided stem portion 386 that merges with an upper portion 388 close to a cross bore 390. The finger 362 has opposite flat side surfaces 396 and a rear edge 398. The upper portion 388 has a downwardly extending claw or hook portion 392 and an opposite hammerhead portion 394 that projects beyond the rear edge 398 of the parallel sided stem portion 386.

Each side surface 396 has a depression 400 above and preferably slightly offset from vertical alignment with the cross bore 390. Another depression 402 is spaced on an arc from depression 400 from the cross bore 390 and toward the hook portion 392. Each of the depressions 400 and 402 is located so as to engage a ball nosed spring plunger 404 that projects from a bore through one or both sides of the base plate 360 into the recess 366. When the finger 362 is rotated on the axle 368 such that the plunger 404 engages the depression 402, the hammerhead portion 394 extends further beyond the rear of the base plate 360 and the hook or claw 392 is raised to an install or release position as shown in FIG. 6 below. When the ball nosed spring plunger 404 engages the depression 400, the finger 362 rotates on the axle 368 such that the hook or claw 392 moves forward with respect to base plate 360 and down with respect to the static metal clamp jaw 364. This detent position permits loose retention of the extruded rail 316 in the assembly as shown in FIG. 7.

FIGS. 6-8 illustrate the operation of each of the rail clamp assemblies 350 shown in FIG. 3 and incorporated into the dual rail clamp assemblies 210 shown in FIG. 2. FIG. 6 is an end view of a single clamp assembly 350 or dual clamp assembly 210 shown in an open first position for receiving a rail 316 therein. It is to be understood that rail 316 may be any one of rails 104, 108, 204, 206, 304, 306, 208 and 308 described above.

In the open first position shown in FIG. 6, the clamp assembly 350 is fully open. With the finger 362 in the position shown in FIG. 6, the ball nose spring plunger 404 engages the depression 402 to hold the finger 362 in an open position. The handle 378 is fully threaded into the beam 326 such that washer 380 abuts against the beam 326. This pushes the base plate 360 laterally away from the beam 326 to the position shown. In this FIG. 6, a rail 316 is either being placed into the assembly 350 or removed therefrom. In the former case, the corner rib 320 is first placed into the lower jaw 364 and then the rail 316 is simply rotated counterclockwise to push the adjacent rib 320 of the rail 316 against the stem portion 386 of the finger 362. This rotation causes the finger 362 to rotate clockwise from the first position until the stem portion 386 of the finger is almost flush with the surface of the base plate 360. At the same time, the ball nose spring plunger 404 now engages the depression 400. The user will feel a tactile snap as the plunger 404 engages the depression 400. This corresponds to the finger 362 position shown in FIG. 7. The handle 378 is then rotated counterclockwise to a position shown in FIG. 7 to prevent the finger 362 from being returned to the open position shown in FIG. 6. With the finger 362 oriented as is shown in FIG. 7, the rail 316 is securely retained, but the rail 316 may be axially or rotatably moved within the assemblies 350 to a desired position.

FIG. 8 shows the clamp assembly 350 in a rail locked position. The handle 378 is further turned counterclockwise to pull the base plate 360 fully against the beam 326. This causes the hammerhead protrusion 394 on the upper portion 388 of the finger 362 to draw flush against the beam 326 so that the hook 392 of the finger 362 clamps the rail 316 against the base plate 360. This rigidly locks the rail 316 between the jaw 364 and the hook 392 and against the base plate 360.

The operation of the clamp assembly 210 shown in FIGS. 2 and 9 is essentially the same as just described except that the base plate 224 has two recesses for two fingers 362, the beam 326 is replaced by the trapezoidal flat mounting base plate 220, and there are two handle shafts 358 drawing the base plate 224 against the trapezoidal flat mounting base plate 220 to clamp the rail 316 in place. In the case of the clamp assembly 210, two hook clamp fingers 362 and all associated parts are installed to a single base plate 224. Because the two hook clamp fingers 362 and associated parts are mechanically affixed to the same base plate 224, there is no rotation permitted between the base plate 224 and the mounting base plate 220, and therefore only axial translation of the rail 316 is permitted when in the retention position shown in FIG. 7.

Many changes may be made to the device, which will become apparent to a reader of this disclosure. For example, the fingers 362 may be shaped differently than above described. The rails 316 may not have four ribs 320 and could be configured with no ribs at all.

All such changes, alternatives and equivalents in accordance with the features and benefits described herein, are within the scope of the present disclosure. Such changes and alternatives may be introduced without departing from the spirit and broad scope of my invention as defined by the claims below and their equivalents.

What is claimed is:

1. A frame apparatus for holding a flexible lance positioning mechanism adjacent to and spaced from a heat exchanger tube sheet, the apparatus comprising:
   a guide rail;
   a positioner rail supported from the guide rail for positioning the flexible lance positioning mechanism; and
   a rail clamp assembly operably holding the guide rail in a fixed position with respect to the tube sheet, the rail clamp assembly comprising:
      one of a flat plate or beam member adapted to be fastened to the tube sheet;
      a base plate spaced from the one of the flat plate or beam member by one or more threaded shafts;
      one or more clamp fingers rotatably fastened to the base plate, wherein the one or more clamp fingers is operable to rotate toward the base plate when the base plate is drawn against the flat plate or beam member and wherein each of the one or more clamp fingers at at least one of a plurality of predetermined positions engages a ball nose spring plunger carried in the base plate operably permitting the guide rail to be attached to the rail clamp assembly.

2. The apparatus according to claim 1 wherein the one of the flat plate or beam member is a generally trapezoidal shaped flat plate having a curved bottom edge and a plurality of apertures therethrough adjacent the bottom edge for receiving a plurality of bolts to fasten the flat plate to the tube sheet.

3. The apparatus according to claim 2 wherein the base plate has a pair of spaced apart clamp fingers rotatably supported therein and one of the one or more threaded shafts is positioned beneath each of the clamp fingers and is fastened to the base plate.

4. A frame apparatus for holding a flexible lance positioning mechanism adjacent to and spaced from a heat exchanger tube sheet, the apparatus comprising:
   a guide rail;
   a positioner rail supported from the guide rail for positioning the flexible lance positioning mechanism; and
   a rail clamp assembly operably holding the guide rail in a fixed position with respect to the tube sheet, the rail clamp assembly comprising:
      one of a flat plate or beam member adapted to be fastened to the tube sheet;
      a base plate spaced from the one of the flat plate or beam member by one or more threaded shafts;
      one or more clamp fingers rotatably fastened to the base plate, wherein each of the one or more clamp fingers is operable to rotate toward the base plate when the base plate is drawn against the flat plate or beam member and wherein each of the one or more clamp fingers at a predetermined position engages a ball nose spring plunger carried in the base plate operably permitting the guide rail to be attached to the rail clamp assembly, wherein the ball nose spring plunger carried in the base plate engages one of the one or more clamp fingers in a first position permitting the guide rail to be attached to the rail clamp assembly and the one of the one or more clamp fingers in a second position permitting the guide rail to be translated along the base plate.

5. The apparatus according to claim 4 wherein the threaded shaft draws the one or more clamp fingers to a third position engaging the guide rail to hold the guide rail within the rail clamp assembly.

6. A frame apparatus for holding a flexible lance positioning mechanism adjacent to and spaced from a heat exchanger tube sheet, the apparatus comprising:
   a guide rail;
   a positioner support rail supported from the guide rail; and
   one or more rail clamp assemblies operable to releasably receive, hold and clamp a portion of the guide rail therein, each rail clamp assembly having a support plate adapted to be fastened to a peripheral portion of the heat exchanger tube sheet, a hand screw threaded through the support plate and rotatably fastened into a base plate, a clamp jaw fastened to the base plate, and a hooked clamp finger rotatably fastened to the base plate opposite the clamp jaw, wherein the base plate carries a ball nose spring plunger releasably engaging the hooked clamp finger to releasably hold the hooked clamp finger in each of a plurality of predetermined positions.

7. The apparatus according to claim 6 wherein the hooked clamp finger is rotatably fastened to the base plate in a rectangular notch in the base plate via an axle screw.

8. The apparatus according to claim 7 wherein the hooked clamp finger has a parallel sided stem portion carried in the notch, a hook portion that extends out of the notch toward the clamp jaw and an opposite hammerhead portion that extends beyond a rear edge of the stem portion.

9. The apparatus according to claim 8 wherein the hooked clamp finger is rotated toward the clamp jaw when the hand screw tightens the base plate to the support plate.

10. The apparatus according to claim 7 wherein the ball nose spring plunger extends out of the base plate into the notch so as to engage a depression in the hooked clamp finger to releasably hold the hooked clamp finger in an open position to receive a portion of the guide rail between the hooked clamp finger and the clamp jaw.

11. The apparatus according to claim 7 wherein the axle screw extends across the notch and the hooked clamp finger is rotatably supported on the axle screw extending across the notch.

12. The apparatus according to claim 8 wherein the hammerhead portion extends toward the support plate from the base plate when the base plate is spaced from the support plate and wherein the hammerhead portion causes the hooked clamp finger to rotate toward the clamp jaw when the base plate is drawn against the support plate.

13. The apparatus according to claim 11 wherein the ball nose spring plunger extends from the base plate into the notch above the axle screw.

14. The apparatus according to claim 13 wherein the ball nose spring plunger releasably engages a first detent in the hook shaped finger when the base plate is spaced from the support plate and the hooked clamp finger is rotated to a release position and engages a second detent in the hooked clamp finger when the hooked clamp finger is rotated to hold the one of the guide rails between the hooked clamp finger and the clamp jaw.

15. An apparatus for holding a flexible lance positioning mechanism adjacent to and spaced from a heat exchanger tube sheet, the apparatus comprising:
   a guide rail;
   a positioner rail supported from the guide rail; and
   a rail clamp assembly operably holding the guide rail in a fixed position with respect to one of the tube sheet and the positioner rail, the rail clamp assembly comprising:
      one of a flat plate or beam member adapted to be fastened to the one of the tube sheet and the positioner rail;
      a base plate spaced from the one of the flat plate or beam member by one or more threaded shafts;
      one or more clamp fingers rotatably fastened to the base plate, wherein the one or more clamp fingers is operable to rotate in a plane perpendicular to the base plate toward the base plate when the base plate is drawn against the one of the flat plate or beam member, and wherein each clamp finger releasably engages a ball nose spring plunger carried in the base plate to releasably hold the clamp finger in each of a first predetermined position and a second predetermined position.

* * * * *